United States Patent
Berdinis et al.

(10) Patent No.: US 10,290,269 B2
(45) Date of Patent: May 14, 2019

(54) HYBRID LIQUID CRYSTAL DISPLAY

(71) Applicant: Motorola Mobility LLC, Chicago, IL (US)

(72) Inventors: Eric D Berdinis, Chicago, IL (US); Toshihiro Fujimura, Chicago, IL (US); Sen Yang, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 251 days.

(21) Appl. No.: 15/056,900

(22) Filed: Feb. 29, 2016

(65) Prior Publication Data

US 2017/0249908 A1    Aug. 31, 2017

(51) Int. Cl.
*G09G 3/36* (2006.01)
*G02F 1/1335* (2006.01)
*G02F 1/1343* (2006.01)

(52) U.S. Cl.
CPC ......... *G09G 3/36* (2013.01); *G02F 1/133555* (2013.01); *G02F 1/134336* (2013.01);
(Continued)

(58) Field of Classification Search
CPC .. G09G 3/34; G09G 3/36; G09G 5/02; G09G 3/3666; G09G 3/3611; G09G 3/20;
(Continued)

(56) References Cited

U.S. PATENT DOCUMENTS 6,636,286 B1 * 10/2003 Baek ................. G02F 1/133514 349/114
2007/0242014 A1 * 10/2007 Lee ................... G02F 1/133514 345/88

(Continued)

FOREIGN PATENT DOCUMENTS

JP    2008015528    1/2008
JP    2008046329    2/2008
(Continued)

OTHER PUBLICATIONS

Anonymous: "Using the Comfortlight on your eReader", Koba, Oct. 3, 2014 (Oct. 3, 2014), XP002773862, Retrieved from the Internet: URL:https://www.kobo.com/help/en-US/article/5370/using-the-comfortlight-on-your-ereader?products=kobo%20aura%20one [retrieved on Sep. 15, 2017].

(Continued)

*Primary Examiner* — Lunyi Lao
*Assistant Examiner* — Johny Lau
(74) *Attorney, Agent, or Firm* — Yudell Isidore PLLC

(57) ABSTRACT

An LCD includes a 2-D array of pixels including at least one transmissive light modulator including a first light modulation signal input, and at least one reflective light modulator including a second light modulation signal input, a processor configured to provide a plurality of images to a display driver; and a display driver configured to provide the plurality of images to the 2-D array of pixels, wherein the display driver provides a first image frame to the transmissive light modulator, wherein the display driver provides a second image frame to the reflective light modulator; wherein the display driver provides a first image frame to the transmissive light modulator, wherein the display driver provides a second image frame to the reflective light modulator, and wherein the first image frame is displayed by the transmissive light modulator at the same time the second image frame is displayed by the reflective light modulator.

20 Claims, 7 Drawing Sheets

(52) U.S. Cl.
CPC ......... *G09G 3/3611* (2013.01); *G09G 3/3666* (2013.01); *G09G 2300/0456* (2013.01); *G09G 2358/00* (2013.01); *G09G 2360/144* (2013.01)

(58) Field of Classification Search
CPC ............. G09G 3/30; G09G 2300/0456; G09G 2358/00; G09G 2360/144; G02F 1/1343; G02F 1/1335; G02F 1/133556; G02F 1/134336
See application file for complete search history.

(56) References Cited

U.S. PATENT DOCUMENTS

| | | | |
|---|---|---|---|
| 2008/0074592 A1* | 3/2008 | Araki | G09G 3/3688 349/114 |
| 2010/0231614 A1 | 9/2010 | Vieri et al. | |
| 2012/0127140 A1 | 5/2012 | Ryan et al. | |
| 2012/0188166 A1* | 7/2012 | Nurmi | G09G 3/3648 345/168 |
| 2013/0187962 A1* | 7/2013 | Vieri | G09G 3/20 345/698 |
| 2013/0215093 A1* | 8/2013 | Bergquist | G09G 3/3208 345/207 |
| 2015/0241725 A1 | 8/2015 | Zhuang et al. | |
| 2015/0243224 A1* | 8/2015 | Zhuang | G02F 1/13306 345/102 |

FOREIGN PATENT DOCUMENTS

| | | |
|---|---|---|
| JP | 2012521017 | 9/2012 |
| WO | 2015/127022 A1 | 8/2015 |

OTHER PUBLICATIONS

European Patent Office, European Search Report, Application No. 17157341.3, dated Oct. 13, 2017.

European Search Report, European Patent Application No. 17157341.3, European Patent Office, dated May 30, 2017.

* cited by examiner

HYBRID LIQUID CRYSTAL DISPLAY

FIELD

The disclosure relates generally to display technology, and more specifically to liquid crystal display (LCD) technology.

BACKGROUND

Mobile electronic devices such as smartphone and tablet computers support powerful, versatile computing and communication. These mobile electronic devices can run thousands of different software applications ("apps"), which are a great convenience to users. However, a limitation of such devices lies in the display technology. In order to provide readability in low to moderate light conditions smartphones and tablets use emissive displays, such LCDs or Active Matrix Organic Light Emitting Diode (AMOLED) displays.

Given the efficiency of such displays in converting electrical energy to visible light and given the limited electrical energy storage (e.g., battery capacity) of portable devices, as a practical matter there is an imposed limit on the brightness and usage per charge of LCD and AMOLED displays. The brightness limits become problematic when using the devices outdoors on bright sunny days. Under such ambient lighting conditions, the unwanted inherent reflectivity of the display in combination with the high ambient light illuminance on the display surface may lead to the displayed image or text being 'washed out' and difficult to see.

In the past, transflective displays have been used on a limited basis. Like other LCD displays, a transflective display includes a 2-D array of pixels and each pixel includes multiple subpixels, for example red, blue and green subpixels. In a transflective display, each subpixel is divided into two parts such that it includes a reflective part and a transmissive part. As in other LCD displays, electric voltages are used to alter the configuration (e.g., the molecular long axis orientation) of the liquid crystals in the display to modulate the passage of light through the display. In the reflective portion, light traverses the liquid crystal twice—once going in and once going out after reflection. On the other hand in the transmissive portion, light from a back light located behind the display traverses the liquid crystal only once on the way out of the display.

Recently there has been a trend toward very high resolution displays. Pixel densities greater than 300 pixels per inch (ppi) are not uncommon and significantly higher pixel densities are on the horizon. Therefore a solution that provides the benefits of transflective displays and is adaptable for high pixel densities is desirable.

SUMMARY

Accordingly, there are provided herein devices and methods that utilize a hybrid display. The hybrid display combines features and elements of a transmissive display and a reflective display, allowing improved functionality for a user.

In a first aspect, a liquid crystal display is disclosed. The liquid crystal display includes: a 2-D array of pixels including: at least one transmissive light modulator including a first light modulation signal input, and at least one reflective light modulator including a second light modulation signal input, a processor configured to provide a plurality of images to a display driver; and a display driver configured to provide the plurality of images to the 2-D array of pixels, wherein the display driver provides a first image frame to the transmissive light modulator and wherein the display driver provides a second image frame to the reflective light modulator; wherein the display driver provides a first image frame to the transmissive light modulator and wherein the display driver provides a second image frame to the reflective light modulator, and wherein the first image frame is displayed by the transmissive light modulator at the same time the second image frame is displayed by the reflective light modulator.

In a second aspect, a method of providing two images on a display is disclosed. The method includes: providing a 2-D array of pixels including: at least one transmissive light modulator including a first light modulation signal input, and at least one reflective light modulator including a second light modulation signal input, and providing a first image to the transmissive light modulator; and providing a second image to the reflective light modulator, wherein the first and second images are distinct from each other.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

The present disclosure describes methods and systems for that allow for a transmissive display and a reflective display to be combined into a hybrid display. Such a hybrid display allows users to use the display outside or indoors, to conceal sensitive information, and to improve the quality of images on the display.

Figure 1:
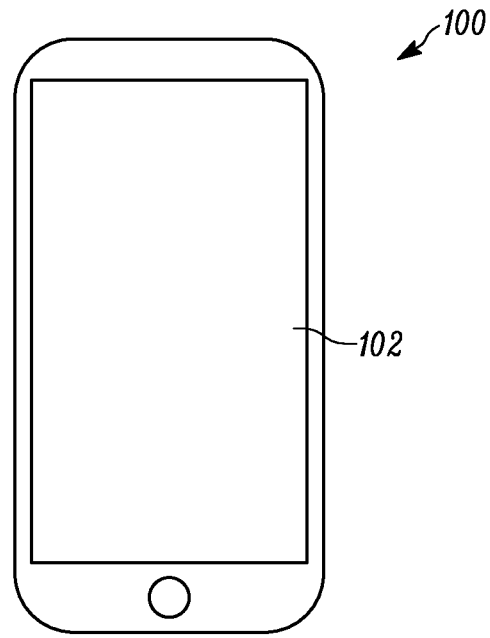
FIG. 1 is a front view of device that incorporates a display built according to some embodiments.

FIG. 1 is a front view of device 100 that incorporates an electronic display 102 built according to some embodiments. Device 100 can be, for example, a smartphone, a hand-held electronic game, or a tablet computer. This device is portable, and may optionally be powered by a limited source of energy and/or used in a variety of ambient light conditions. For example, device 100 may be used indoors or outdoors under ambient lighting conditions that range from very dark to vary bright.

Figure 2:
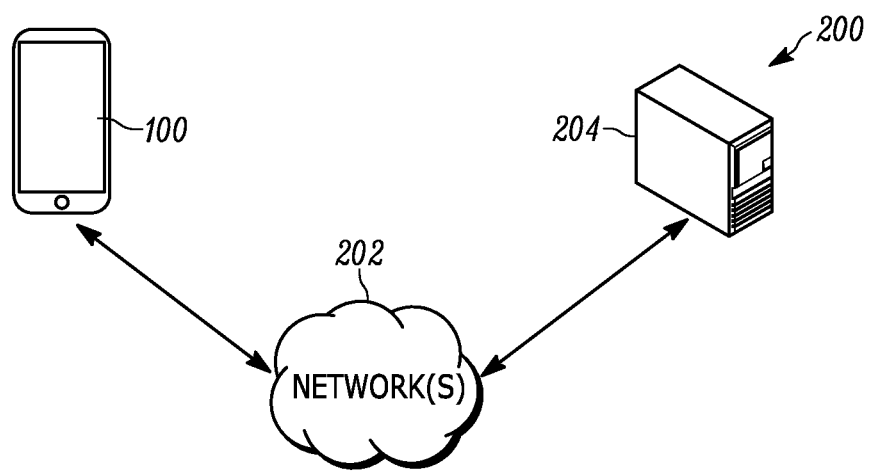
FIG. 2 is a schematic of a system in which the device shown in FIG. 1 is used according to some embodiments.

FIG. 2 is a schematic of system 200 in which device 100 shown in FIG. 1 is used according to some embodiments. System 200 includes one or more interconnected networks 202 such as for example, the Internet, one or more Wi-Fi networks and/or one or more cellular telephony networks. Device 100 can communicatively couple to one or more interconnected networks 202, for example by a Wi-Fi communication link or by via a cellular telephony link. Server computer 204 is also connected to one or more interconnected networks 202 and hence can be communicatively coupled to device 100 through one or more interconnected networks 202. Content to be displayed on display 102 of device 100 may be received from server computer 204 via one or more interconnected networks 202. Supported by network connectivity, device 100 may display a variety of data such as webpages, electronic books, videos, icons, menus, and messages in a variety of formats including: full-color video and graphics; color, black-and-white, and sepia photographs; black (or another color) text on a light background; white (or another color) text on a dark background; and others.

Figure 3:
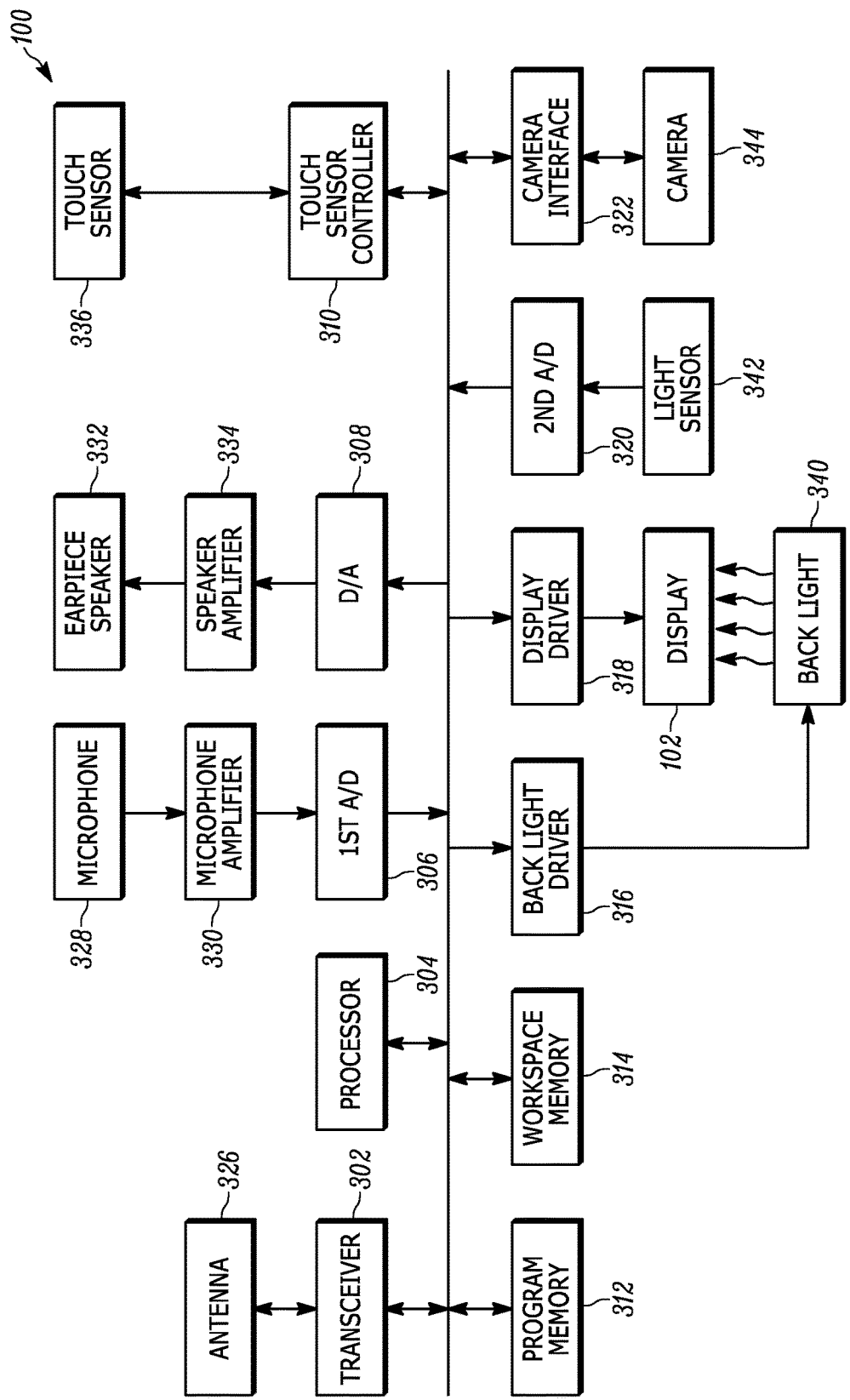
FIG. 3 is a block diagram of the device shown in FIG. 1 according to some embodiments.

FIG. 3 is a block diagram of device 100 shown in FIG. 1 according to some embodiments. As shown in FIG. 3 device 100 includes transceiver 302, processor 304, first analog-to-digital converter (A/D) 306, a digital-to-analog converter (D/A) 308, a touch sensor 310, a program memory 312, workspace memory 314, back light driver 316, display driver 318, second A/D 320, and camera interface 322 all coupled to system bus 324. Transceiver 302 is coupled to antenna 326 so that device 100 can transmit and receive information wirelessly.

Processor 304 controls the overall operation of device 100. Processor 304 uses workspace memory 314 to execute programs stored in program memory 312. First A/D 306 is coupled to microphone 328 via microphone amplifier 330, so that voice and other sounds can be input into device 100. D/A 308 is coupled to earpiece speaker 332 via speaker amplifier 334, so that voice audio and other sounds can be output from device 100. Touch sensor 336 is coupled to touch sensor controller 310. Touch sensor 336 is positioned over display 102, which is coupled to display driver 318. Although device 100 may include a touchscreen display 102, the display may also be implemented without a touch sensor.

Back light driver 316 is coupled to back light 340, which is optically coupled to display 102. Back light 340 may optionally be selectively driven according to logic that takes into account a prevailing ambient light level and an assessment of user interaction with device 100, or selection of a particular mode by the user. Light sensor 342 is coupled to second A/D 320. Camera 344 is coupled to camera interface 322. Images or video clips captured by camera 344 can be displayed on display 102.

Figure 4:
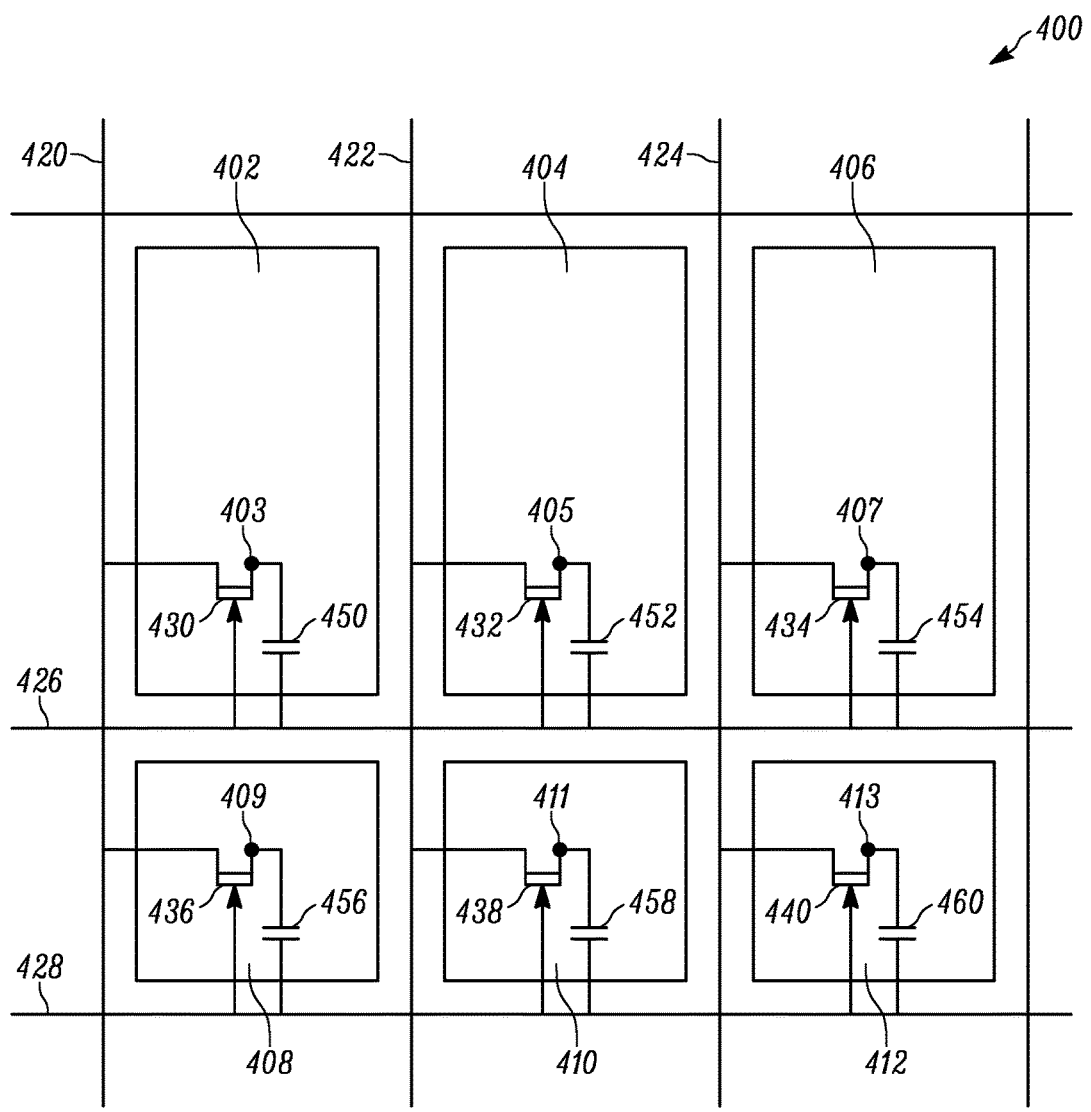
FIG. 4 is a top (plan) view of a pixel that can be implemented in a display that may be used in the device shown in FIG. 1 and which includes different subpixels that modulate light in different ways according to some embodiments of the present application.

FIG. 4 is a top (plan) view of pixel 400 that can be implemented in display 102 of device 100 shown in FIG. 1 and which includes different subpixels that modulate light in different manners according to some embodiments of the present application. Referring to FIG. 4, pixel 400 includes first subpixel 402, second subpixel 404, third subpixel 406, fourth subpixel 408, fifth subpixel 410, and sixth subpixel 412. Fourth subpixel 408, fifth subpixel 410, and sixth subpixel 412 are each transmissive light modulators that, based on a liquid crystal state, independently transmit and modulate (or block) the intensity of light that emanates from the back light 340. Thus light can pass from back light 340 through fourth subpixel 408, fifth subpixel 410, and sixth subpixel 412 to a viewer. Pixel 400 may be part of 2-D array that forms the display. In some embodiments, each of the pixels in the 2-D array has the same general structure as pixel 400.

Each of fourth subpixel 408, fifth subpixel 410, and sixth subpixel 412 may include a different transmissive color filter, for example, respectively, color filters that transmit red, green, and blue light. Each of the color filters has different spectral bandpass. Alternatively different color filters can be used, for example, cyan, magenta, and yellow.

As shown, first subpixel 402, second subpixel 404, and third subpixel 406 are reflective light modulators. One or more of first subpixel 402, second subpixel 404, and third subpixel 406 may optionally include a color filter. The spectral bandpass of first subpixel 402, second subpixel 404, and third subpixel 406 may be broader than that of fourth subpixel 408, fifth subpixel 410, and sixth subpixel 412, and may, for example, reflect light that is white or slightly tinted. In some embodiments, a color filter for the reflective subpixel is used to correct the reflective subpixel to white. In some embodiments, the color of the reflective subpixel is a white color having a color temperature between 3200K and 8000K and a abs(Duv)<0.05 when illuminated with a D65 light source. When liquid crystal material is aligned, first subpixel 402, second subpixel 404, and third subpixel 406 can reflect ambient light incident on first subpixel 402, second subpixel 404, and third subpixel 406 while modulating its intensity. When the liquid crystal material is not aligned to "on state", it prevents much of the ambient light from reaching the reflective material in first subpixel 402, second subpixel 404, and third subpixel 406 or effects or fails to effect the polarization of light so as to prevent the reflected light from passing through a polarizer (not shown) located at the front (top) of pixel 400.

First subpixel 402 and fourth subpixel 408 are both served by first column data line 420. Second subpixel 404 and fifth subpixel 410 are both served by column data line 422. Third subpixel 406 and sixth subpixel 412 are both served by column data line 424. Each of the reflective light modulator (first subpixel 402, second subpixel 404, and third subpixel 406) are served by row select line 426. Each of the transmissive light modulator (fourth subpixel 408, fifth subpixel 410, and sixth subpixel 412) are served by row select line 428. First subpixel 402, second subpixel 404, third subpixel 406, fourth subpixel 408, fifth subpixel 410, and sixth subpixel 412, respectively, include first subpixel input 403, second subpixel input 405, third subpixel input 407, fourth subpixel input 409, fifth subpixel input 411, and sixth subpixel 413, which are, respectively, coupled to drains of first thin film transistor (TFT) 430, second TFT 432, third TFT 434, fourth TFT 436, fifth TFT 438, and sixth TFT 440. Alternatively, TFD (thin film diode) or other types of circuits can perform the function similar to TFT.

Gates of first TFT 430, second TFT 432, and third TFT 434, are coupled to row select line 426. Gates of fourth TFT 436, fifth TFT 438, and sixth TFT 440 are coupled to row select line 428. First storage capacitor 450, second storage capacitor 452, and third storage capacitor 454 each include a first terminal coupled to row select line 426 and second terminal coupled, respectively, to first subpixel input 403, second subpixel input 405, and third subpixel input 407. Fourth storage capacitor 456, fifth storage capacitor 458, and sixth storage capacitor 460 each include a first terminal coupled to row select line 428 and second terminal coupled, respectively, to fourth subpixel input 409, fifth subpixel input 411, and sixth subpixel input 413.

First storage capacitors 450, second storage capacitors 452, third storage capacitors 454, fourth storage capacitors 456, fifth storage capacitors 458, and sixth storage capacitors 460 each serve to maintain (subject to some charge leakage between write display scan cycles) a voltage level applied through either first column data line 420, second column data line 422, and third column data line 424, when first TFT 420, second TFT 422, third TFT 424, fourth TFT 426, fifth TFT 438, and sixth TFT 440 are turned on.

Because each subpixel is either only a transmissive light modulator or a reflective light modulator drive signals used to drive each of the two types of subpixels can be individually adjusted. This is in contrast to transflective subpixels where the same control voltage drives both the reflective light modulator part and the transmissive light modulator part. Specifically the voltage for each pixel brightness value can be chosen so that each type of subpixel (reflective or transmissive) responds with improved fidelity to a given desired input output response for example linearly or according to a predetermined gamma value. This may be important because in a typical transflective subpixel the transmissive and reflective light modulator portions do not exhibit identical brightness as a function of voltage.

In some embodiments, a ratio of the surface area for the transmissive light modulators (e.g., fourth subpixel 408, fifth subpixel 410, and sixth subpixel 412) to the reflective light modulators (first subpixel 402, second subpixel 404, and third subpixel 406) is about 1:1 to about 1:3. In some embodiments, the of the surface area for the transmissive light modulators is about 1:1.5 to about 1:2. In some embodiments, the of the surface area for the transmissive light modulators is about 1:1.7. The ratio may be selected to improve reflectance.

The display containing pixel 400 (e.g., electronic display 102 in device 100 as depicted in FIG. 1) may, in some embodiments, have one, two, three, or more operation modes. Examples of operation modes include, but are not limited to, reflective mode, transmissive mode, and hybrid mode. In some embodiments, the device can operate in reflective mode, where the transmissive light modulators (e.g., fourth subpixel 408, fifth subpixel 410, and sixth subpixel 412) are turned off using a row select line (e.g., row select line 428) that controls the transmissive light modulators. The reflective light modulators (first subpixel 402, second subpixel 404, and third subpixel 406) are turned on using a row select line (e.g., row select line 426) that controls the transmissive light modulators and the amount of light reflected controlled by the column data lines (e.g., column data line 420, column data line 422, and column data line 424). Operation in reflective mode may, in some embodiments, provide higher resolution (e.g., three times increase in available pixels) than transmissive mode (discussed below). This is because each reflective light modulator may be used to function as a separate grey-scale pixel. In contrast, when the transmissive light modulators are used to transmit, for example, red, green, and blue colors, then the three transmissive light modulators may together form a single color pixel.

In some embodiments, the device can operate in transmissive mode, where the reflective light modulators are turned off using a row select line that controls the reflective light modulators. The transmissive light modulators can be turned on using the appropriate row select line and the color emitted controlled by the column data lines.

In some embodiments, the device can operate in hybrid mode, where both the transmissive light modulators and reflective light modulators are turned on using the row select lines. In some embodiments of the hybrid mode, the transmissive light modulator and reflective light modulator sharing the same column data line (e.g., first subpixel 402 and fourth subpixel 408 share column data line 420) will receive the same signal. As a non-limiting example, pixel 400 may be provided a signal to display the color red (which has the RGB color (255, 0, 0)). Assuming subpixel 408, subpixel 410, and subpixel 412 correspond, respectively, to the colors red, green, and blue, column data line 420 may provide the signal '255' to both subpixel 402 and subpixel 408, while column data line 422 and column data line 424 both provide the signal '0'. Thus, this example of hybrid mode provides a simple procedure for encoding color data into greyscale for display on the reflective light modulators. In some embodiments of the hybrid mode, the transmissive light modulator and reflective light modulator sharing the same column data line will receive different signals by appropriately modulating the column data line and row select lines. In some embodiments, hybrid mode may provide the advantage of displaying color images from the transmissive light modulators under appropriate lighting (e.g., indoors), but when the ambient light is too intense to view the color images, a greyscale image appears that is produced by the reflective light modulators.

The device may, in some embodiments, be configured to select between different modes. In some embodiments, the device uses a light sensor (e.g., light sensor 342 depicted in FIG. 3) for sensing ambient light conditions and then this information may be used by a processor (e.g., processor 304) to select a display mode suitable for the lighting conditions. In some embodiment, the display mode may be selected, at least in part, by input from a user.

There are several ways for implementing hybrid mode on a device, and the present application is not limited any particular procedure. In some embodiments, a processor sends an image to the display driver (e.g., RGB frames at 60 Hz), which stores the image in memory. The display driver writes the image to the transmissive light modulators. The display driver also performs a calculation to convert the image (e.g., to greyscale) for writing to the reflective light modulators. By including memory in the display driver, the processor can optionally only send image frames when there is a change, and may only send the portion of the image that has changed.

In some embodiments, a processor sends two images to the display driver, where one image is for display using the reflective light modulators and the other is for display using the transmissive light modulators. The display driver stores both images in memory and writes the values to the transmissive light modulators and reflective light modulators. By having memory in the display driver, the processor may only send image frames when there is a change, and may only send the portion of the image that has changed. This procedure also allows for the reflective light modulators and transmissive light modulators to receive separate and independent image data.

In some embodiments, the display driver does not have memory to store image data. A processor sends two images to the display driver, where one image is for display using the reflective light modulators and the other is for display using the transmissive light modulators. The display driver writes this data to the transmissive light modulators and reflective light modulators. The processor may continue to send full image frame data for both images regardless of whether the image changes. This procedure also allows for the reflective light modulators and transmissive light modulators to receive separate and independent image data.

In some embodiments, the display driver only contains enough memory to story images for the transmissive light modulate or reflective light modulators, but not both. The display driver may be configured to only store data for the reflective light modulators, to only store data for the transmissive light modulators, or to switch use of the memory for either modulators (e.g., selecting which data to store based on anticipated power consumption). A processor sends two images to the display driver, where one image is for display using the reflective light modulators and the other is for display using the transmissive light modulators. The display driver stores one of the images in memory and writes the values to the transmissive light modulators and reflective light modulators. By having memory in the display driver for one of the images, the processor may only send image frames for one of the images when there is a change (e.g., the image not stored in memory), and may only send the portion of the image that has changed (e.g., for the image that is stored in memory). This procedure also allows for the reflective light modulators and transmissive light modulators to receive separate and independent image data.

The use of hybrid mode is not limited to any particular image or images, or any particular application. In some embodiments, hybrid mode may be used to add subtle texture features to an image, such as shadows or sheens to graphics. For example, the transmissive light modulators may provide the primary image, while the reflective light modulators add the texture features. In some embodiments, hybrid mode can be used to show two readable images at once. For example, the transmissive light modulators may show a first image, while the reflective light modulators may show a second image that is different than the first image. The different images are displayed at the same time. In some embodiments, hybrid mode may be used to organize data with depth. In some embodiments, hybrid mode may be used to show a machine-readable image (e.g., a QR code, bar code, and the like), and a second image visible to a user. For example, the transmissive light modulators may show a company logo, while the reflective light modulators may show a QR code that provides a link to the companies website. The QR code may not be visible to a user under ambient light conditions, but is machine readable (e.g., by a camera that uses a flash to illuminate the display). In some embodiments, hybrid mode is used to provide background behind an image. For example, the transmissive light modulators may display text, while the reflective light modulator may produce alternating grey and white background lines the makes each line of text more easily distinguished by a user. In some embodiments, hybrid mode can be used to create a 3D or parallax effect using offset pixels.

Figure 5:
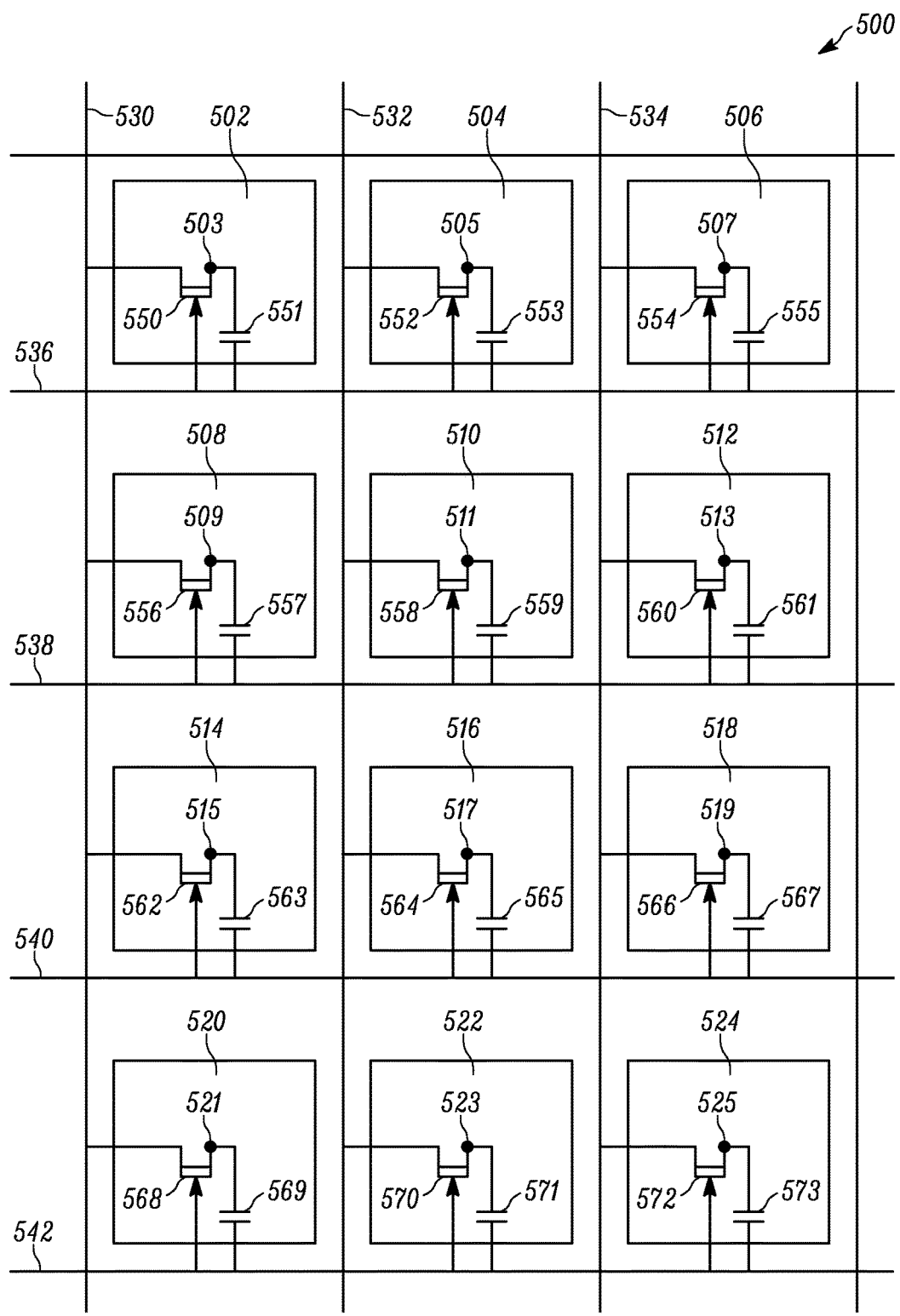
FIG. 5 is a top (plan) view of a pixel that can be implemented in a display that may be used in the device shown in FIG. 1 and which includes different subpixels that modulate light in different ways according to a first pixel embodiment of the present application.

FIG. 5 is a top (plan) view of pixel 500 that can be implemented in display 102 of device 100 shown in FIG. 1 and which includes different subpixels that modulate light in different manners according to some embodiments of the present application. Referring to FIG. 5, pixel 500 includes first subpixel 502, second subpixel 504, third subpixel 506, fourth subpixel 508, fifth subpixel 510, sixth subpixel 512, seventh subpixel 514, eighth subpixel 516, ninth subpixel 518, tenth subpixel 520, eleventh subpixel 522, and twelfth subpixel 524. Tenth subpixel 520, eleventh subpixel 522, and twelfth subpixel 524 are each transmissive light modulators that, based on a liquid crystal state, independently transmit and modulate (or block) the intensity of light that emanates from the back light 340. Thus light can pass from back light 340 through tenth subpixel 520, eleventh subpixel 522, and twelfth subpixel 524 to a viewer. Pixel 500 may be part of 2-D array that forms the display. In some embodiments, each of the pixels in the 2-D array has the same general structure as pixel 500.

Each of tenth subpixel 520, eleventh subpixel 522, and twelfth subpixel 524 may include a different transmissive color filter, for example, respectively, color filters that transmit red, green, and blue light. Each of the color filters has different spectral bandpass. Alternatively different color filters can be used, for example, cyan, magenta, and yellow.

As shown, first subpixel 502, second subpixel 504, third subpixel 506, fourth subpixel 508, fifth subpixel 510, sixth subpixel 512, seventh subpixel 514, eighth subpixel 516, and ninth subpixel 518 are reflective light modulators. One or more of first subpixel 502, second subpixel 504, third subpixel 506, fourth subpixel 508, fifth subpixel 510, sixth subpixel 512, seventh subpixel 514, eighth subpixel 516, and ninth subpixel 518 may optionally include a color filter. The spectral bandpass of first subpixel 502, second subpixel 504, third subpixel 506, fourth subpixel 508, fifth subpixel 510, sixth subpixel 512, seventh subpixel 514, eighth subpixel 516, and ninth subpixel 518 may be broader than that of tenth subpixel 520, eleventh subpixel 522, and twelfth subpixel 524, and may, for example, reflect light that is white or slightly tinted. In some embodiments, a color filter for the reflective subpixel is used to correct the reflective subpixel to white. In some embodiments, the color of the reflective subpixel is a white color having a color temperature between 3200K and 8000K and a abs(Duv)<0.05 when illuminated with a D65 light source. When liquid crystal material is aligned, first subpixel 402, second subpixel 404, and third subpixel 406 can reflect ambient light incident on first subpixel 402, second subpixel 404, and third subpixel 406 while modulating its intensity. When the liquid crystal material is not aligned to "on state", it prevents much of the ambient light from reaching the reflective material in first subpixel 502, second subpixel 504, third subpixel 506, fourth subpixel 508, fifth subpixel 510, sixth subpixel 512, seventh subpixel 514, eighth subpixel 516, and ninth subpixel 518 or effects or fails to effect the polarization of light so as to prevent the reflected light from passing through a polarizer (not shown) located at the front (top) of pixel 500.

First subpixel 502, fourth subpixel 508, seventh subpixel 514, and tenth subpixel 520 are each served by first column data line 530. Second subpixel 504, fifth subpixel 510, eighth subpixel 516, and eleventh subpixel 522 are each served by column data line 632. Third subpixel 506, sixth subpixel 512, ninth subpixel 518, and twelfth subpixel 524 are each served by column data line 634. First subpixel 502, second subpixel 504, and third subpixel 506 are served by row select line 636. Fourth subpixel 508, fifth subpixel 510, and sixth subpixel 512 are served by row select line 638. Seventh subpixel 514, eighth subpixel 516, and ninth subpixel 518 are served by row select line 640. Each of the transmissive light modulator (tenth subpixel 520, eleventh subpixel 522, and twelfth subpixel 524) are served by row select line 542.

First subpixel 502, second subpixel 504, third subpixel 506, fourth subpixel 508, fifth subpixel 510, sixth subpixel 512, seventh subpixel 514, eighth subpixel 516, ninth subpixel 518, tenth subpixel 520, eleventh subpixel 522, and twelfth subpixel 524, respectively, include first subpixel input 503, second subpixel input 505, third subpixel input 507, fourth subpixel input 509, fifth subpixel input 511, sixth subpixel 513, seventh subpixel 515, eighth subpixel 517, ninth subpixel 519, tenth subpixel 521, eleventh subpixel 523, and twelfth subpixel 525, which are, respectively, coupled to drains of first thin film transistor (TFT) 550, second TFT 553, third TFT 554, fourth TFT 556, fifth TFT 558, sixth TFT 560, seventh TFT 562, eighth TFT 564, ninth TFT 566, tenth TFT 568, eleventh TFT 570, and twelfth TFT 572. Alternatively, TFD (thin film diode) or other types of circuits can perform the function similar to TFT.

Gates of first TFT 550, second TFT 552, and third TFT 554 are coupled to row select line 536. Gates of fourth TFT 556, fifth TFT 558, and sixth TFT 560 are coupled to row select line 538. Gates of seventh TFT 562, eighth TFT 564, and ninth TFT 566 are coupled to row select line 540. Gates of tenth TFT 568, eleventh TFT 570, and twelfth TFT 572 are coupled to row select line 542. Thus, row select line 542 is coupled to the three transmissive light modulators.

First storage capacitor 551, second storage capacitor 553, and third storage capacitor 555 each include a first terminal coupled to row select line 536 and second terminal coupled, respectively, to first subpixel input 503, second subpixel input 505, and third subpixel input 507. Fourth storage capacitor 557, fifth storage capacitor 559, and sixth storage capacitor 561 each include a first terminal coupled to row select line 538 and second terminal coupled, respectively, to fourth subpixel input 509, fifth subpixel input 511, and sixth subpixel input 513. Seventh storage capacitor 563, eighth storage capacitor 565, and ninth storage capacitor 567 each include a first terminal coupled to row select line 540 and second terminal coupled, respectively, to seventh subpixel input 515, eighth subpixel input 517, and ninth subpixel input 519. Tenth storage capacitor 569, eleventh storage capacitor 571, and twelfth storage capacitor 573 each include a first terminal coupled to row select line 542 and second terminal coupled, respectively, to tenth subpixel input 521, eleventh subpixel input 523, and sixth subpixel input 525.

First storage capacitor 551, second storage capacitor 553, third storage capacitor 555, fourth storage capacitor 557, fifth storage capacitor 559, sixth storage capacitor 561, seventh storage capacitor 563, eighth storage capacitor 565, ninth storage capacitor 567, tenth storage capacitor 569, eleventh storage capacitor 571, and twelfth storage capacitor 573 each serve to maintain (subject to some charge leakage between write display scan cycles) a voltage level applied through either first column data line 530, second column data line 532, and third column data line 534, when first TFT 550, second TFT 552, and third TFT 554 are coupled to row select line 536. Gates of fourth TFT 556, fifth TFT 558, and sixth TFT 560 are turned on.

As discussed above with respect to pixel 400 in FIG. 4, pixel 500 in FIG. 5 signals used to drive each of the two types of subpixels can be individually adjusted. Moreover, a display utilizing pixel 500 may be operated in at least three modes, such as reflective mode, transmissive mode, and hybrid mode as discussed above.

In some embodiment, the reflective mode used in pixel 500 provides a greater resolution than transmissive mode (e.g., 3 times greater resolution). This is because each of the reflective light modulators may operate independently as grey-scale pixels, while the transmissive light modulators may be combined to form a single color pixel. In reflective mode or hybrid mode, a display driver (e.g., display driver 318 in FIG. 3) may receive a 3× image from an application processor (e.g., processor 304 in FIG. 3) and the display driver will write the values to the reflective light modulators at 1:1 ratio. That is, each reflective light modulator can receive a unique signal. In transmissive or hybrid mode, the driver will transform the write values to reflect the lower resolution provided by the transmissive light modulator (e.g., 1 transmissive light modulator for every three reflective light modulators). As a non-limiting example, the write values for first subpixel 502, fourth subpixel 508, and seventh subpixel 514 may be averaged and then written to tenth subpixel 520. In other words, the write values for each of the three reflective light modulators coupled to the same column data line are transformed into a single value (e.g, averaged) and then this single value is written to the transmissive light modulator also coupled to the same column data line.

In some embodiments, an application processor (e.g., processor 304 in FIG. 3) may provide two images to a display driver (e.g., display driver 318 in FIG. 3): a higher-resolution image for displaying using the reflective light modulators and a lower-resolution image for displaying using the transmissive light modulators. The higher-resolution and lower-resolution images may have the same content or different content.

Figure 6:
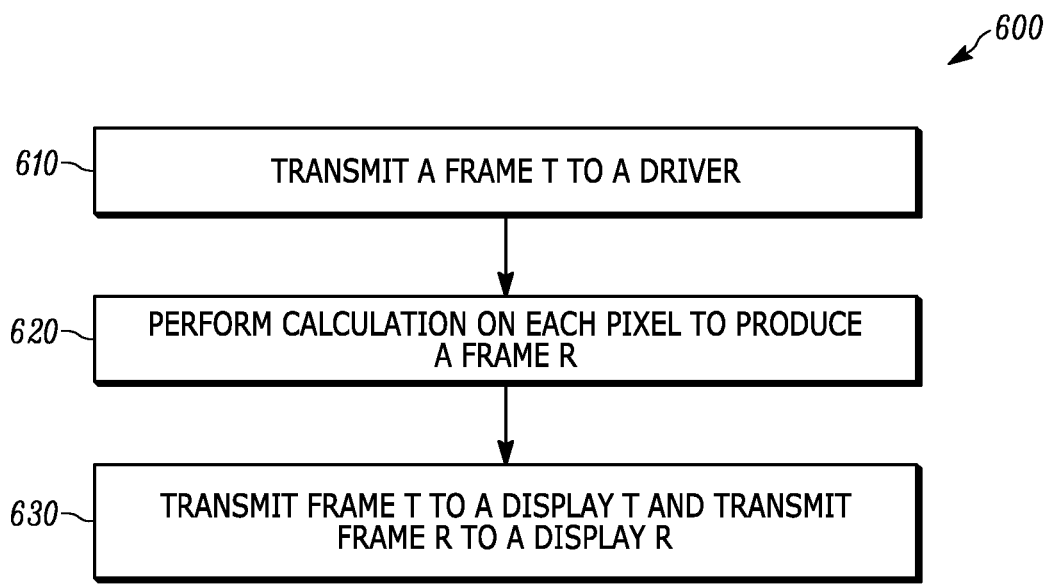
FIG. 6 is a flow diagram of a process for displaying image frames that may used in the device shown in FIG. 1 and which include different subpixels that modulate light in different ways according to some embodiments of the present application.

FIG. 6 is a flow diagram of a process for displaying image frames that may used in the device shown in FIG. 1 and which including different subpixels that modulate light in different ways according to some embodiments of the present application. Process 600 depicted in FIG. 6 may be used, in some embodiments, be used to perform hybrid mode (as discussed above) using a display device (e.g., display device 100 depicted in FIG. 1 having pixel 400 depicted in FIG. 4 and/or pixel 500 depicted in FIG. 5). Process 600 includes operation 610, "Transmit a Frame T to a Driver," operation 620, "Perform Calculation on each Pixel to Produce a Frame R," and operation 630, "Transmit Frame T to a Display T and Transmit Frame R to a Display R." Operation 610, operation 620, and operation 630 may be performed sequentially, or two or more the operations may be performed at about the same time.

Process 600 may begin with operation 610, "Transmit a Frame T to a Driver." For example, an application processor (e.g., processor 304 depicted in FIG. 3) may send an image frame to a display driver (e.g., display driver 318 depicted in FIG. 3). The format and content of frame T in operation 610 is not limited, but may generally be configured for display using the transmissive light modulators. In some embodiments, frame T may have a resolution that corresponds 1:1 with the transmissive light modulators. For example, if the display contains 100 pixels, each with three transmissive light modulators (e.g., red, green, and blue colors), frame T may contain RGB color coding for 100 pixels. In some embodiments, the display driver does not include memory that stores image frame T received from the processor.

Operation 610 may be followed by operation 620, "Perform Calculation on each Pixel to Produce a Frame R." Operation 620 may be used to convert image frame T, which is configured for display using the transmissive light modulators, to an image frame R, which is configured for display using the reflective light modulators. The conversion calculation is not particularly limited and can be any conversion that creates suitable image frame data for display by the reflective light modulators.

One non-limiting example of a conversion calculation that may be performed in operation 620 includes the following: image frame T (received by display driver in operation 610) includes RGB color codes for pixel 400 depicted in FIG. 4, where each subpixel 408, subpixel 410, and subpixel 412 correspond, respectively, to the colors red, green, and blue. A calculation is performed for each of the red, green, and blue values (e.g., a polynomial equation that accounts for ambient lighting conditions) to convert the signal into appropriate values for display on subpixel 402, subpixel 404, and subpixel 406, respectively. Thus, the signal assigned to each transmissive light modulator is converted for display on the reflective light modulator in the same pixel that is coupled to a common column data line with the respective transmissive light modulator (or in other words, the reflective light modulator immediately above each of the transmissive light modulators as depicted in FIG. 4). This example conversion may be similarly applied to pixel 500 as depicted in FIG. 5, however the conversion calculation would determine appropriate signals for each of the three reflective light modulators from the signal for the transmissive light modulator in the same pixel that is coupled to the same column data line.

Operation 620 may be followed by operation 630, "Transmit Frame T to a Display T and Transmit Frame R to a Display R." Frame T can be transmitted to the transmissive light modulators for display and frame R can be transmitted to the reflective light modulators. In some embodiments, image frame T and image frame R are displayed on the display at about the same time.

Process 600 can repeated as needed to continuously display images on the display. For example, the processor may repeatedly transmit frame T image data at 60 Hz.

Figure 7:
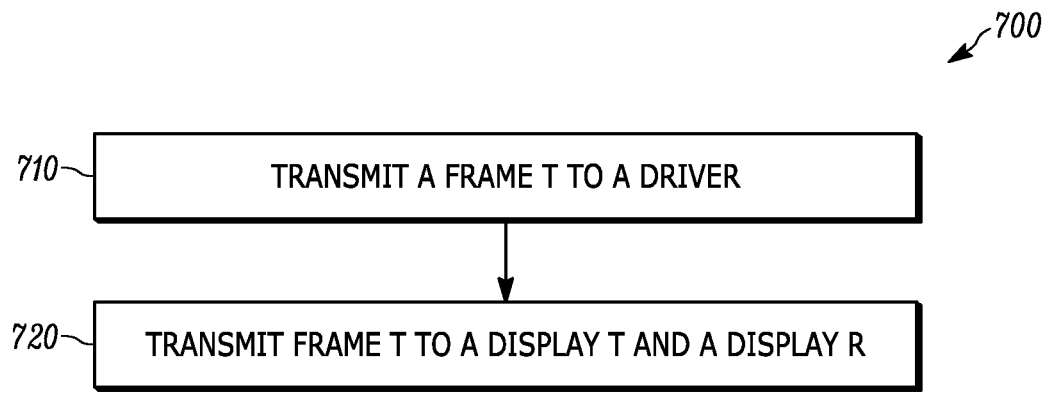
FIG. 7 is a flow diagram of a process for displaying image frames that may used in the device shown in FIG. 1 and which include different subpixels that modulate light in different ways according to some embodiments of the present application.

FIG. 7 is a flow diagram of a process for displaying image frames that may used in the device shown in FIG. 1 and which including different subpixels that modulate light in different ways according to some embodiments of the present application. Process 700 depicted in FIG. 7 includes operation 710, "Transmit a Frame T to a Driver" and operation 720, "Transmit Frame T to a Display T and a Display R." Operation 710 and operation 720 may be performed sequentially, or the operations may be performed at about the same time.

Process 700 may begin with operation 710, "Transmit a Frame T to a Driver." For example, an application processor (e.g., processor 304 depicted in FIG. 3) may send an image frame to a display driver (e.g., display driver 318 depicted in FIG. 3). The format and content of frame T in operation 710 is not limited, but may generally be configured for display using the transmissive light modulators. In some embodiments, frame T may have a resolution that corresponds 1:1 with the transmissive light modulators. For example, if the display contains 100 pixels, each with three transmissive light modulators (e.g., red, green, and blue colors), frame T may contain RGB color coding for 100 pixels. In some embodiments, the display driver does not include memory that stores image frame T received from the processor.

Operation 710 may be followed by operation 720, "Transmit Frame T to a Display T and a Display R." Frame T may be transmitted to both the transmissive light modulators and the reflective light modulators. In contrast to process 600 depicted in FIG. 6, process 700 may not include a calculation to produce frame R. As a non-limiting example, image frame T (received by display driver in operation 710) includes RGB color codes for pixel 400 depicted in FIG. 4, where each subpixel 408, subpixel 410, and subpixel 412 correspond, respectively, to the colors red, green, and blue. The signal assigned to each transmissive light modulator is also provided to the respective reflective light modulator in the same pixel that is coupled to a common column data line with the transmissive light modulator (or in other words, the reflective light modulator immediately above each of the transmissive light modulators as depicted in FIG. 4). This example may be similarly applied to pixel 500 as depicted in FIG. 5, however each of the three reflective light modulators may receive the same signal as the transmissive light modulator in the same pixel that is coupled to the same column data line.

Process 700 can repeated as needed to continuously display images on the display. For example, the processor may repeatedly transmit frame T image data at 60 Hz.

Figure 8:
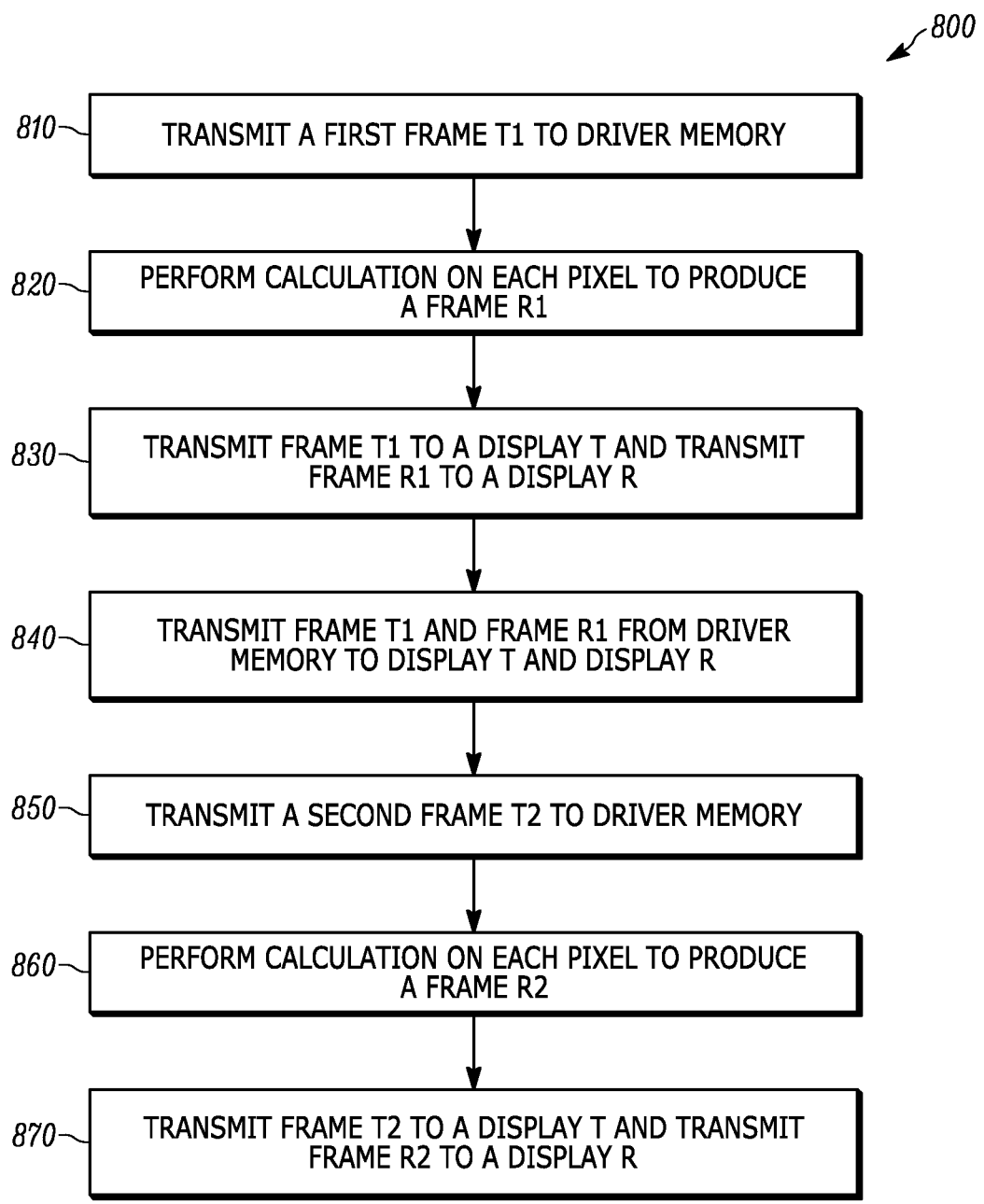
FIG. 8 is a flow diagram of a process for displaying image frames that may used in the device shown in FIG. 1 and which include different subpixels that modulate light in different ways according to some embodiments of the present application.

FIG. 8 is a flow diagram of a process for displaying image frames that may used in the device shown in FIG. 1 and which include different subpixels that modulate light in different ways according to some embodiments of the present application. Process 800 depicted in FIG. 8 includes operation 810, "Transmit a First Frame T1 to Driver Memory," operation 820, "Perform Calculation on each Pixel to Produce a Frame R1," operation 830, "Transmit Frame T1 to Display T and Transmit Frame R1 to a Display R," operation 840, "Transmit Frame T1 and Frame R1 from Driver Memory to Display T and Display R1," operation 850, "Transmit a Second Frame T2 to Driver Memory," operation 860, "Perform Calculation on each Pixel to Produce a Frame R2," and operation 870, "Transmit Frame T2 to a Display T and Transmit Frame R2 to a Display R." Operation 810, operation 820, operation 830, operation 840, operation 850, operation 860, and operation 870 may be performed sequentially, or one or more operations may be performed at about the same time.

Process 800 may begin with operation 810, "Transmit a First Frame T1 to Driver Memory." For example, an application processor (e.g., processor 304 depicted in FIG. 3) may send an image frame to a display driver (e.g., display driver 318 depicted in FIG. 3). The format and content of frame T1 in operation 810 is not limited, but may generally be configured for display using the transmissive light modulators. In some embodiments, frame T1 may have a resolution that corresponds 1:1 with the transmissive light modulators. For example, if the display contains 100 pixels, each with three transmissive light modulators (e.g., red, green, and blue colors), frame T1 may contain RGB color coding for 100 pixels. The driver can contain memory that stores the received frame T1.

Operation 810 may be followed by operation 820, "Perform Calculation on each Pixel to Produce a Frame R1." Operation 820 may be used to convert frame T1, which is configured for display using the transmissive light modulators, to frame R1, which is configured for display using the reflective light modulators. The conversion calculation is not particularly limited and can be any conversion that creates suitable frame data for display by the reflective light modulators. The non-limiting examples discussed above with regard to operation 620 depicted in FIG. 6 may be used, in some embodiments, in operation 820. In some embodiments, the calculated frame R1 can be stored in driver memory.

Operation 820 may be followed by operation 830, "Transmit Frame T1 to a Display T and Transmit Frame R1 to a Display R." Frame T1 can be transmitted to the transmissive light modulators for display and frame R1 can be transmitted to the reflective light modulators for display. In some embodiments, frame T1 and image frame R1 are displayed on the display at about the same time.

Operation 830 may be followed by operation 840, "Transmit Frame T1 and Frame R1 from Driver Memory to Display T and Display R." The driver may use frame T1 and frame R1 stored in memory to repeat transmission of the same frames. Thus, a processor may only provide frames to display driver when a change is made to frames to be displayed (e.g., user input on touchscreen results in display change). When no changes occur, display driver may use frames T1 and R1 stored in memory for transmitting to the display.

Operation 840 may be followed by operation 850, "Transmit a Second Frame T2 to Driver Memory." The processor sends a second image frame, frame T2, to driver memory for storage. Frame T2 will typically be different than T1, but this is not required. As an example, user input on a touchscreen may prompt a change in the display that results in processor transmitting frame T2 to driver memory. In some embodiments, the processor is configure to only transmit frame T2 if frame T2 is different than frame T1. In some embodiments, only the portions of frame T2 that differ from frame T1 are transmitted to driver memory. For example, the processor may not send data for any pixel in frame T2 that is the same in frame T1.

Operation 850 may be followed by operation 860, "Perform Calculation on each Pixel to Produce a Frame R2." Operation 860 may, in some embodiments, include performing the same calculation performed in operation 820. In some embodiments, operation 860 may perform a different calculation than performed in operation 820. For example, the device may perform a different calculation due changes in ambient lighting conditions, or because the device has changed display modes. In some embodiments, the calculations are only performed on pixels that have changed between frame T1 and frame T2.

Operation 860 may be followed by operation 870, "Transmit Frame T2 to a Display T and Transmit Frame R2 to a Display R." Frame T2 can be transmitted to the transmissive light modulators for display and frame R2 can be transmitted to the reflective light modulators for display. In some embodiments, frame T2 and image frame R2 are displayed on the display at about the same time.

Process 800 can repeated as needed to continuously display images on the display. For example, the processor transmit new frames each time a change in the display is required.

Figure 9:
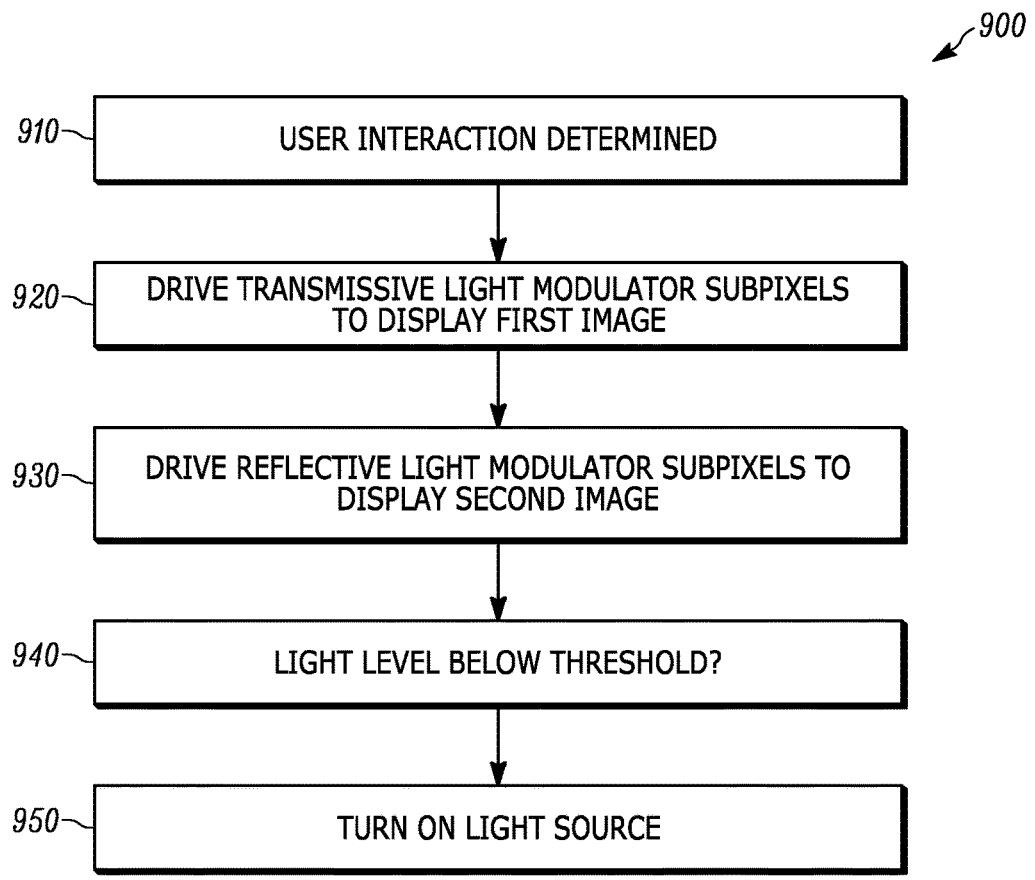
FIG. 9 is a flow diagram of a process for displaying image frames that may used in the device shown in FIG. 1 and which include different subpixels that modulate light in different ways according to some embodiments of the present application.

FIG. 9 is a flow diagram of a process for displaying image frames that may used in the device shown in FIG. 1 and which include different subpixels that modulate light in different ways according to some embodiments of the present application. Process 900 depicted in FIG. 9 includes operation 910, "User Interaction Determined," operation 920, "Drive Transmissive Light Modulator Subpixels to Display First Image," operation 930, "Drive Reflective Light Modulators Subpixels to Display Second Image," operation 940, "Light Level Below Threshold?," and operation 950, "Turn on Light Source." Operation 910, operation 920, operation 930, operation 940, and operation 950, may be performed sequentially, or one or more operations may be performed at about the same time.

Process 900 may begin with operation 910, "User Interaction Determined." The device may determine that a user interaction has occurred. For example, a user may contact a touch screen such that touch sensor 336 as depicted in FIG. 3 sends a signal to touch sensor controller 310, which determines whether a user has interacted with the touchscreen and then sends a signal to processor 304 regarding any interaction.

Operation 910 may be followed by operation 920, "Drive Transmissive Light Modulator Subpixels to Display First Image." If a user interaction has been determined in operation 910, a processor may change the display based on the interaction. Processor may transmit a first frame to the display driver, which in turn transmits the frame to the transmissive light modulators to display the first frame.

Operation 920 may be followed by operation 930, "Drive Reflective Light Modulators Subpixels to Display Second Image." Operation 930 may occur before, after, or at about the same time as operation 920. The processor may also determine that a change in the display is also required for the reflective light modulators. Processor may transmit a second frame to the display driver, which in turn transmits the frame to the reflective light modulators to display the second frame. The first frame displayed by the transmissive light modulators in operation 910 may be the same or different that the second frame displayed by the reflective light modulators in operation 920.

Operation 930 may be followed by operation 940, "Light Level Below Threshold?,". Operation 940 may occur before, after, or at about the same time as operation 920 and/or operation 930. The device can determine if the ambient light level is below a certain threshold such that a change in display mode may be required. For example, the device may be operating in reflective mode, such that the display only uses reflective light modulators to display images (e.g., the back light is off such that the transmissive light modulators do not transmit light). The device may determine that the ambient light is below a threshold in which the reflective light modulators can no longer display images meeting a certain level of visibility. Referring to FIG. 3, the device may utilize light sensor 342 to determine the light level.

Operation 940 may be followed by operation 950, "Turn on Light Source." The device can turn on a light source to improve visibility of the display. As an example, the device may turn on a back light (e.g., back light 340 depicted in FIG. 3), which may enable the display using the transmissive light modulators.

Figure 10:
FIG. 10 shows depicts an example of a sensitive message that can be display using a device, which includes different subpixels that modulate light in different ways and is within the scope of the present application.

Some embodiments disclosed herein relate to displaying or concealing sensitive information using a device, which includes different subpixels that modulate light in different ways. FIG. 10 shows depicts an example of a sensitive message that can be display using a device, which includes different subpixels that modulate light in different ways and is within the scope of the present application.

The left box in FIG. 10 shows an example of a sensitive message. The text "SECRET MESSAGE" is displayed in a frame in purple (RGB color code (200, 0, 200)) with a yellowish background (RGB color code (200, 200, 0)). This frame can be displayed in hybrid mode, for example, using process 600 depicted in FIG. 6, where the color frame transmitted to the transmissive light modulators can be converted to greyscale for transmission to the reflective light modulators. The conversion procedure can be such that the purple and yellowish colors result in the same greyscale. Alternatively, the frame can displayed in hybrid mode using process 700 depicted in FIG. 7, where frame T is configured such that the reflective display results in the purple and yellowish colors being the same in grey scale. In either case, "SECRET MESSAGE" is only visible using the transmissive light modulators, which, in some embodiments, may not be visible in bright ambient light that makes the back light not visible. A user may cover the display to reduce ambient to view the message visible from the transmissive light modulators.

As a specific non-limiting example, the display may use pixel 400 as depicted in FIG. 4. Each transmissive light modulator (e.g., subpixel 408, subpixel 410, and subpixel 412) is coupled to column data line shared with a reflective light modulator (e.g., subpixel 402, subpixel 404, and subpixel 406). For the purple color of the text "SECRET MESSAGE", the signal '200' is provided to transmissive light modulator corresponding to red and also the reflective light modulator sharing the column data line, the signal '0' for the green transmissive light modulator and also the reflective light modulator sharing the column data line, and the signal '200' for the blue transmissive light modulator and also the reflective light modulator sharing the column data line. The net result from the transmissive light modulators is the color purple for the text, while the net result from the reflective light modulators is a greyscale averaging the three signals for the text. For yellowish background, the signal '200' is provided to transmissive light modulator corresponding to red and also the reflective light modulator sharing the column data line, the signal '200' for the green transmissive light modulator and also the reflective light modulator sharing the column data line, and the signal '0' for the blue transmissive light modulator and also the reflective light modulator sharing the column data line. The net result from the transmissive light modulators is the yellowish color for the background, while the net result from the reflective light modulators is a greyscale averaging the three signals for the text. Because the average grey scale is the same for both the purple and yellowish colors, the reflective mode does no show the text, while the transmissive mode does. Thus, if the ambient lighting is too bright to view the transmissive light, then the text cannot be viewed, for example, unless the lighting is reduced to allow viewing.

The right box in FIG. 10 shows another example of a concealed message. In this embodiment, the text "SECRET MESSAGE" is displayed in a frame in a yellowish color (RGB color code (200, 200, 0)) with a turquoise background (RGB color code (0, 200, 200)). Using the same principles discussed above, the text may only be viewed when the lighting allows view on the transmissive mode.

Although the examples provided in FIG. 10 related to text, the present application is not limited to this. Any image desired to be concealed in bright ambient conditions may implemented. For example, a drawing may be concealed using the processes disclosed above. Moreover, the process does not require that all pixels be concealed using this procedure, so long as enough pixels are concealed that the concealed information cannot be discerned.

Accordingly, the present disclosure is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module or step is for ease of description. Specific functions can be moved from one module or step to another without departing from the disclosure.

The various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine readable storage media such as RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

We claim:
1. A liquid crystal display comprising:
a 2-D array of pixels, each pixel including:
three reflective light modulators arrange as a row of subpixels and served by a first row select line that provides a first light modulation signal input, each reflective light modulator coupled to a respective first, second, and third column data line; and
three transmissive light modulators arranged as a second adjacent row of subpixels that aligns each of the three transmissive light modulators with a respective adjacent one of the three reflective light modulators, the three transmissive light modulators served by a second row select line that provides a second light modulation signal input, each transmissive light modulator also coupled to the respective first, second, and third column data line to which the adjacent reflective light modulator is coupled;
and
a display driver coupled to a processor that provides a plurality of images, the display driver configured to receive the plurality of images from the processor and to provide the plurality of images to the 2-D array of pixels in hybrid mode, wherein the display driver provides a first image frame to the three transmissive light modulators of one or more pixels and provides a second image frame to the three reflective light modulators of a same one or more pixels;

wherein the first image frame is displayed by the transmissive light modulator at the same time the second image frame is displayed by the reflective light modulator;

wherein the first image frame and the second image frame have at least one of a different content or a different resolution from each other; and wherein signals used to drive the three reflective light modulators and the three transmissive light modulators can be individually adjusted and a different control voltage drives the reflective light modulators and the transmissive light modulators.

2. The display of claim 1, wherein the processor provides the first and second image frames to the display driver as two images including a higher-resolution image for displaying using the reflective light modulators and a lower-resolution image for displaying using the transmissive light modulators.

3. The display of claim 1, further comprising a memory in communication with the display driver and configured to store image frames provided by the display driver, wherein the display driver provides the first image to the memory cell to be accessed by the transmissive light modulator, and wherein the display driver provides the second image directly to the reflective light modulator.

4. The display of claim 1, further comprising a memory in communication with the display driver and configured to store image frames provided by the display driver, wherein the display driver provides the second image to the memory cell to be accessed by the reflective light modulator, and wherein the display driver provides the first image directly to the transmissive light modulator.

5. The display of claim 1, further comprising a light sensor in communication with the display driver, which controls the transmissive and reflective light modulators, the light sensor configured to detect a level of ambient light and send the detected ambient light level to the processor, which determines what image frame to display on the transmissive and reflective light modulators, wherein the processor:

determines, if the ambient light level detected by the light sensor of the device is below a threshold in which the reflective light modulators cannot display images meeting a level of visibility;

selecting, by the processor, based on the sensed ambient light conditions, a display mode suitable for the lighting conditions, wherein when the ambient light is above the threshold, the processor configures the display driver to operate the display in a reflective mode, where a back light is off and transmissive light modulators do not transmit light, such that the display only uses reflective light modulators to display images, and when the ambient light is below the threshold, the processor configures the display driver to operate the display in transmissive mode, where the back light is on and the transmissive light modulators transmit light.

6. The display of claim 1, further comprising a light source in communication with the reflective light modulator, the light source configured to illuminate the reflective light modulator, enabling the second image frame to display.

7. The display of claim 1, wherein the content of the first image frame is different than the content of the second image frame.

8. The display of claim 1, wherein the content of the first image frame is the same as the content of the second image frame and the first image frame has a higher resolution for displaying using the reflective light modulators and the second image frame has a lower resolution for displaying using the transmissive light modulators.

9. The display of claim 1, wherein a ratio of a number of reflective light modulators to a number of transmissive light modulators is approximately 9-to-1.

10. The method of claim 1, wherein the display driver utilizes the hybrid mode to provide at least one of:

adding subtle texture features to an image, such as shadows or sheens to graphics, wherein the transmissive light modulators provides a primary image, while the reflective light modulators add the texture features;

showing a machine-readable image and a second image visible to a user, wherein the transmissive light modulators show the second image, while the reflective light modulators show the machine readable image, which is not visible to a user under ambient light conditions;

providing background behind an image; and creating a 3D effect using offset pixels.

11. The display of claim 1, wherein the three transmissive light modulators and three reflective light modulators comprises a respective thin film transistor (TFT) that receives a respective input coupled to a drain of the TFT, wherein each gate of a first TFT, second TFT, and third TFT of the three reflective light modulators is coupled to the first row select line, and each gate of a fourth TFT, fifth TFT, and sixth TFT of the three transmissive light modulators is coupled to the second row select line, wherein a voltage for each pixel brightness value can be chosen so that each type of light modulator responds with improved fidelity to a given desired input output response.

12. The display of claim 1, wherein the display can be configured to operate in one of a reflective mode, a transmissive mode, and the hybrid mode:

when the display operates in the reflective mode, the transmissive light modulators are turned off using a corresponding row select line that controls the transmissive light modulators and the reflective light modulators are turned on using the first row select line that controls the transmissive light modulators, and the amount of light reflected is controlled by the column data lines for each modulator;

when the display operates in the transmissive mode, the reflective light modulators are turned off using the first row select line that controls the reflective light modulators and the transmissive light modulators are turned on using the second row select line, and a color emitted is controlled by the column data lines; and when the display operates in the hybrid mode:

both the transmissive light modulators and reflective light modulators are turned on using respective second and first row select lines;

the transmissive light modulator and reflective light modulator sharing the same column data line will receive different signals by appropriately modulating the column data line and row select lines;

wherein the hybrid mode enables displaying color images from the transmissive light modulators under appropriate lighting, and displaying a greyscale image that is produced by the reflective light modulators when the ambient light is too intense to view the color images.

13. The display of claim 1, wherein the hybrid mode enables the concealing of images in bright ambient conditions by configuring the display to:

transmit a color frame of a sensitive message to the transmissive light modulators;

convert the color frame to a greyscale image for transmission to the reflective light modulators; and transmit the greyscale image of the sensitive message to the reflective light modulators, wherein the sensitive message is only visible using the transmissive light modulators and is not visible in bright ambient light that makes a back light not visible.

14. A method of providing two images on a display comprising:

providing a 2-D array of pixels, each pixel including:
three reflective light modulators arrange as a row of subpixels and served by a first row select line that provides a first light modulation signal input, each reflective light modulator coupled to a respective first, second, and third column data line; and three transmissive light modulators arranged as a second adjacent row of subpixels that aligns each of the three transmissive light modulators with a respective adjacent one of the three reflective light modulators, the three transmissive light modulators served by a second row select line that provides a second light modulation signal input, each transmissive light modulator also coupled to the respective first, second, and third column data line to which the adjacent reflective light modulator is coupled;

providing a first image to the transmissive light modulators; and providing a second image to the reflective light modulators, wherein the first and second images are distinct from each other, wherein the first image frame and the second image frame have at least one of a different content or a different resolution from each other, and wherein the first image frame and second image frame are displayed at the same time on a respective modulator in a hybrid mode;

wherein signals used to drive the three reflective light modulators and the three transmissive light modulators can be individually adjusted and a different control voltage drives the reflective light modulators and the transmissive light modulators.

15. The method of claim 14, wherein the second image is derived from the first image by performing a calculation on pixels of the first image.

16. The method of claim 14, further comprising:
storing the first image in a memory cell.

17. The method of claim 16, wherein the second image is derived from the stored first image.

18. The method of claim 14, wherein the first image comprises one of a color image and a grey scale image.

19. The method of claim 14, further comprising:
turning on a light source to enable the second image to be viewed by a user.

20. A method of providing two images on a display, the method comprising:

providing a 2-D array of pixels, each pixel including:
three reflective light modulators arrange as a row of subpixels and served by a first row select line that provides a first light modulation signal input, each reflective light modulator coupled to a respective first, second, and third column data line; and three transmissive light modulators arranged as a second adjacent row of subpixels that aligns each of the three transmissive light modulators with a respective adjacent one of the three reflective light modulators, the three transmissive light modulators served by a second row select line that provides a second light modulation signal input, each transmissive light modulator also coupled to the respective first, second, and third column data line to which the adjacent reflective light modulator is coupled;

providing a first image to the transmissive light modulator; and providing a second image to the reflective light modulator, wherein the first image and second image are the same image and the first image has a higher resolution for displaying using the reflective light modulators and the second image has a lower resolution for displaying using the transmissive light modulators;

wherein signals used to drive the three reflective light modulators and the three transmissive light modulators can be individually adjusted and a different control voltage drives the reflective light modulators and the transmissive light modulators.

* * * * *